(12) United States Patent
Wu et al.

(10) Patent No.: US 12,066,347 B2
(45) Date of Patent: Aug. 20, 2024

(54) SENSORY ARRAY STRUCTURES WITH TWO OR MORE DIFFERENT SETS OF RESOLUTION, METHOD OF FABRICATION OF AND METHOD OF OPERATING SAME

(71) Applicant: Sanctuary Cognitive Systems Corporation, Vancouver (CA)

(72) Inventors: Kevin Jiaming Wu, Vancouver (CA); Connor Richard Shannon, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 415 days.

(21) Appl. No.: 17/386,877

(22) Filed: Jul. 28, 2021

(65) Prior Publication Data
US 2022/0034738 A1 Feb. 3, 2022

Related U.S. Application Data

(60) Provisional application No. 63/057,461, filed on Jul. 28, 2020.

(51) Int. Cl.
*G01L 5/22* (2006.01)
*G01L 5/169* (2020.01)

(52) U.S. Cl.
CPC ............. *G01L 5/226* (2013.01); *G01L 5/169* (2020.01)

(58) Field of Classification Search
CPC ......... G01L 5/226; G01L 5/169; G01L 5/228; G06F 3/0338
See application file for complete search history.

(56) References Cited

U.S. PATENT DOCUMENTS

| | | | |
|---|---|---|---|
| 7,331,245 B2* | 2/2008 | Nishimura | G06F 3/04144 73/818 |
| 9,347,838 B2* | 5/2016 | Chen | G01L 1/142 |
| 9,490,804 B2* | 11/2016 | Hanumanthaiah | H03K 17/98 |
| 10,088,915 B2* | 10/2018 | Drum | G06F 3/0338 |

(Continued)

FOREIGN PATENT DOCUMENTS

| | | | | |
|---|---|---|---|---|
| CN | 205038626 U | * | 2/2016 | |
| CN | 110006559 A | * | 7/2019 | G01L 1/142 |

(Continued)

*Primary Examiner* — Octavia Hollington
(74) *Attorney, Agent, or Firm* — Thomas Mahon; Adenike Adebiyi

(57) ABSTRACT

Tactile sensing using both coarse and fine tactile sensors. A coarse tactile sensor having a first sensitive area at least partially encompasses or overlies a plurality of fine tactile sensors, each having a respective sensitive area smaller than the first sensitive area. The coarse tactile sensor(s) and fine tactile sensors may be carried on a same circuit board or separate circuit boards. Processor(s) circuits are communicatively coupled to the coarse and/or fine tactile sensors. Information indicative of at least a presence or absence of force or pressure at a given location monitored by the respective tactile sensor, and/or a measure of the force or pressure or strain is collected. Such may be mounted to a backing, and optionally covered or encased in an artificial skin. Collecting sensor readings employs both coarse and fine tactile sensors, sampling corresponding fine tactile sensors in response to detection by a coarse tactile sensor.

19 Claims, 5 Drawing Sheets

(56) References Cited

U.S. PATENT DOCUMENTS

| | | | | |
|---|---|---|---|---|
| 10,866,642 B2* | 12/2020 | Rosenberg | ............ | G06F 3/0416 |
| 11,460,364 B1* | 10/2022 | Chen | ........................ | G01L 1/127 |
| 11,781,925 B2* | 10/2023 | Kinjo | ....................... | G01L 1/146 |
| | | | | 73/628 |
| 2009/0200815 A1* | 8/2009 | Sugahara | ............... | B25J 13/082 |
| | | | | 73/862.581 |
| 2012/0072131 A1* | 3/2012 | Ikebe | ...................... | G01L 5/226 |
| | | | | 702/41 |
| 2020/0094412 A1* | 3/2020 | Casse | ...................... | G01L 5/226 |

FOREIGN PATENT DOCUMENTS

| | | | | | | |
|---|---|---|---|---|---|---|
| JP | 2012247403 | A | * | 12/2012 | .............. | G01L 1/16 |
| JP | 2014077662 | A | * | 5/2014 | | |
| JP | 2019517076 | | * | 6/2019 | | |
| JP | 2020034298 | A | * | 3/2020 | .............. | G01L 1/22 |
| KR | 20140132219 | A | * | 11/2014 | .......... | G06F 3/0414 |
| KR | 20140132221 | | * | 11/2014 | | |
| KR | 20190054100 | A | * | 5/2019 | | |
| RU | 2474866 | C2 | * | 2/2013 | | |

\* cited by examiner

SENSORY ARRAY STRUCTURES WITH TWO OR MORE DIFFERENT SETS OF RESOLUTION, METHOD OF FABRICATION OF AND METHOD OF OPERATING SAME

TECHNICAL FIELD

The present disclosure generally relates to efficiently detecting intensities and patterns of pressure applied to a surface, for example the surface of a robot, through a set of overlapping force or pressure sensors of varying sizes.

BACKGROUND

Description of the Related Art

The field of robotics is becoming increasingly sophisticated, although does not approach what is depicted in science fiction or popular culture in complexity or elegance. Recently, humanoid appearing robots have been proposed, including those with head, torso, and one or more limbs (e.g., arm type appendages). Some of these humanoid appearing robots employ an artificial skin, typically in the form of silicone.

Input and/or output (I/O) interfaces is one of the major areas of research and development in the field of robotics. There is a need to evolve I/O interfaces to more seamless operate with the outside world.

BRIEF SUMMARY

An apparatus for tactile sensing using both coarse and fine tactile sensors, may be particularly useful in robotics, for example as part of an artificial skin of a humanoid appearing robot. A coarse tactile sensor having a first sensitive area at least partially encompasses or overlies a plurality of fine tactile sensors, each having a respective sensitive area smaller than the first sensitive area. The coarse tactile sensor(s) and fine tactile sensors may be carried on a same circuit board or separate circuit boards. Processor(s) circuits are communicatively coupled to the coarse and/or fine tactile sensors. Information indicative of at least a presence or absence of force or pressure at a given location monitored by the respective tactile sensor, and/or a measure of the force or pressure or strain is collected. Such may be mounted to a backing, and optionally covered or encased in an artificial skin. A method of collecting sensor readings employs both coarse and fine tactile sensors, sampling corresponding fine tactile sensors in response to detection by a coarse tactile sensor.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, certain structures associated with synthetic or artificial skins, pressure sensors, electrical power circuitry, communications networks or other communications channels, and various sensors or transducers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or to "one embodiment" or "an embodiment" means that a particular feature, structure or characteristic described in connection with the embodiment is included in at least one implementation or embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings provided herein are for convenience only and do not interpret the scope or meaning of the various implementations or embodiments.

Figure 1A:
FIG. 1A is a side elevational view of a sensor array structure according to at least one illustrated implementation, the sensor array structure including a coarse set of sensors and a fine set of sensor arranged with respect to the sensor(s) of the coarse set of sensors to provide at least two different sensor resolutions.

FIG. 1A shows a sensor array structure 100a, according to at least one illustrated implementation. The sensory array structure 100a comprises a printed circuit board 102 having a first face and a second bottom face, the second face opposed to the first face across a thickness of the printed circuit board 102. The printed circuit board 102 in this implementation may advantageously comprise a flexible circuit board, with one or more layers of electrically insulating material and one or more layers of conductive materials which may be patterned to form conducive traces and/or vias. The printed circuit board 102 may comprise a relatively small number of layers, and/or may comprise material sufficiently flexible that the printed circuit board is able to flex within a defined range without structural failure. In other implementations, the printed circuit board 102 may be a rigid printed circuit board.

Mechanically and electrically coupled to the one face of printed circuit board 102 is a set of coarse tactile sensors 104 (only one called out). Each of the coarse tactile sensors 104 has a respective coarse detection area 105 over which the coarse tactile sensors 104 are sensitive to applied pressure or force. Similarly, a set of fine tactile sensors 106 (only one called out) are mechanically and electrically coupled to the other face of the printed circuit board 102. Each of the fine tactile sensors 106 has a respective fine detection area 107 over which the fine tactile sensor 106 is sensitive to applied pressure or force. The fine tactile=sensors 106 are arrayed or stacked with respect to the coarse tactile sensors 104 such that each coarse detection area 105 is at least partially overlapped with a plurality of fine detection areas 107. The coarse tactile sensors 104 and/or the fine tactile sensors 106 may take the form of any of a variety of force or pressure sensitive sensors or transducers, for example force sensing resistor (FSR) sensors employing a layer of FSR material.

The sensor array structure 100a may include a backing 108. While the coarse tactile sensors 104 are shown immediate or adjacent the backing 108, in at least some implementations the fine tactile sensors 106 may be immediate or adjacent the backing 108. Where used, for example, as an artificial "skin" of a robot, the fine tactile sensors 106 may be positioned outwardly of the coarse tactile sensors 104, or alternatively the coarse tactile sensors 104 may be positioned outwardly of the fine tactile sensors 106. The printed circuit board 102 may be mechanically coupled (e.g., adhesively) to, or may otherwise be supported by, the backing 108.

Figure 1B:
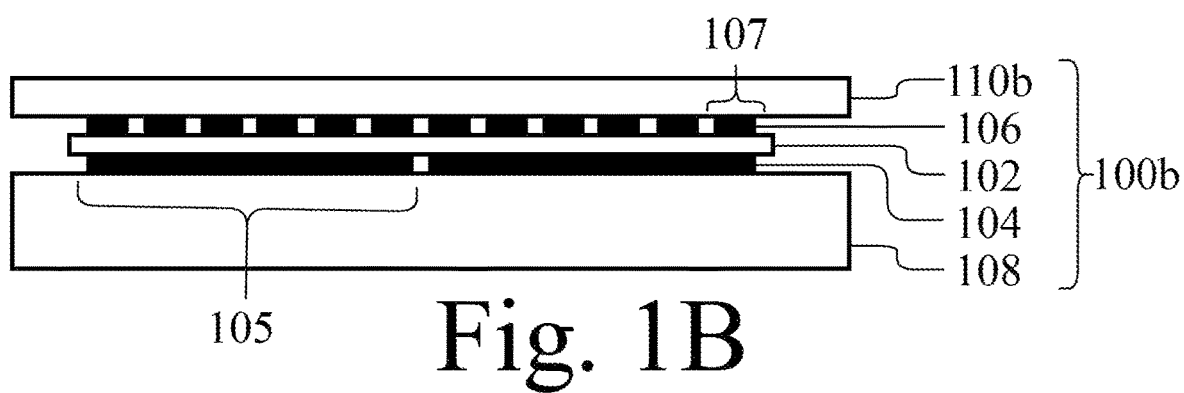
FIG. 1B is a side elevational view of a sensor array structure according to at least one illustrated implementation, the sensor array structure including a coarse set of sensors and a fine set of sensor arranged with respect to the sensor(s) of the coarse set of sensors to provide at least two different sensor resolutions, and further comprising a flexible covering or artificial skin overlying the sensors.

FIG. 1B shows a sensor array structure 100b, according to at least one illustrated implementation. The sensor array structure 100b, is similar or even identical in many respects to the sensor array structure 100a (FIG. 1A), similar or even identical structures identified using the same reference numbers as used with respect to the implementation of FIG. 1A. Only significant differences are described below.

Most notably, sensor array structure 100b further comprises a flexible membrane, artificial skin or covering 110b that overlies both the coarse tactile sensors 104 and the fine tactile sensors 106. The flexible membrane, artificial skin or covering 110b is sufficiently flexible as to transfer force or pressure applied to the backing 108 to the coarse tactile sensors 104 and the fine tactile sensors 106 may without appreciable diminution. The flexible membrane, artificial skin or covering layer 110b may provide environmental protection to the coarse tactile sensors 104 and/or the fine tactile sensors 106, for example protecting the coarse tactile sensors 104 and/or the fine tactile sensors 106 from coming into contact with electrically conductive, corrosive, or other materials that may damage or otherwise disable the functionality of the fine tactile sensors 106, the coarse tactile sensors 104, or the printed circuit board 102 and any associated circuitry. The flexible membrane, artificial skin or covering 110b may, for example comprise or even consist of silicone, for example a layer of unreinforced silicone, or a layer of fiber reinforced silicone. The flexible membrane, artificial skin or covering 110b may be mechanically coupled (e.g., adhesively) to, or may otherwise be supported by, the backing 108. Alternatively or additionally, the flexible membrane, artificial skin or covering 110b may be mechanically coupled (e.g., adhesively) to, or may otherwise be supported by, the printed circuit board 102.

While the flexible membrane, artificial skin or covering 110b is illustrated immediate or adjacent the fine tactile sensors 106, in at least some implementations the flexible membrane, artificial skin or covering 110b may be immediate or adjacent the coarse tactile sensors 104. Where used, for example, as an artificial "skin" of a robot, the fine tactile sensors 106 may be positioned outwardly of the coarse tactile sensors 104, or alternatively the coarse tactile sensors 104 may be positioned outwardly of the fine tactile sensors 106.

Figure 1C:
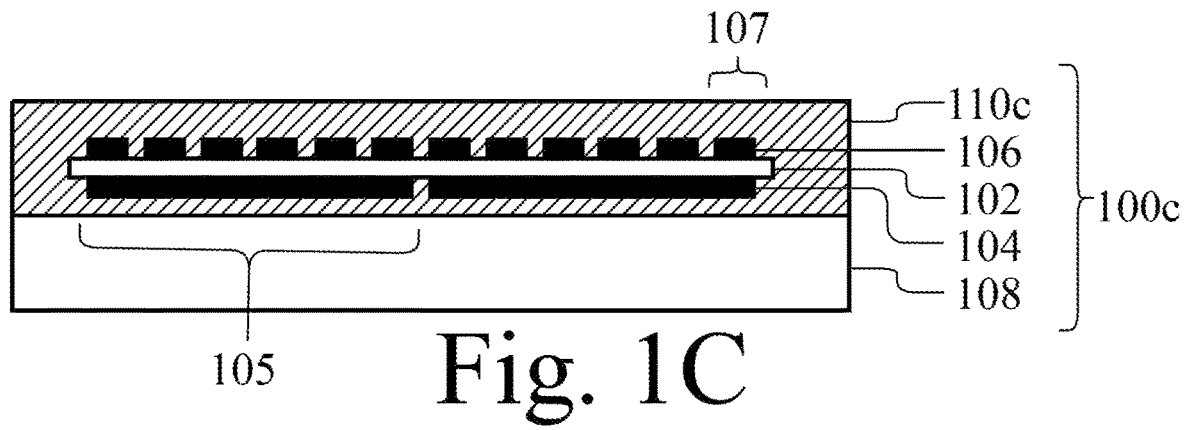
FIG. 1C is a side elevational view of a sensor array structure according to at least one illustrated implementation, the sensor array structure including a coarse set of sensors and a fine set of sensor arranged with respect to the sensor(s) of the coarse set of sensors to provide at least two different sensor resolutions, and further comprising a flexible covering or artificial skin in which the sensors are embedded or encompassed.

FIG. 1C shows a sensor array structure 100c, according to at least one illustrated implementation. The sensor array structure 100c, is similar or even identical in many respects to the sensor array structure 100a (FIG. 1A) and/or the sensor array structure 100b (FIG. 1B), similar or even identical structures identified using the same reference numbers as used with respect to the implementations of FIGS. 1A and 1B. Only significant differences are described below.

Most notably, sensor array structure 100c further comprises a flexible membrane, artificial skin or layer 110c in which both the coarse tactile sensors 104 and the fine tactile sensors 106 are embedded, encompassed and/or molded. The flexible membrane, artificial skin or covering 110b is sufficiently flexible as to transfer force or pressure applied to the backing 108 to the coarse tactile sensors 104 and the fine tactile sensors 106 may without appreciable diminution. The flexible membrane, artificial skin or layer 110c may provide environmental protection to the coarse tactile sensors 104 and/or the fine tactile sensors 106, for example protecting the coarse tactile sensors 104 and/or the fine tactile sensors 106 from coming into contact with electrically conductive, corrosive, or other materials that may damage or otherwise disable the functionality of the fine tactile sensors 106, the coarse tactile sensors 104, or the printed circuit board 102 and any associated circuitry. In this implementation the flexible membrane, artificial skin or layer 110c may be formed or cast or molded such that the printed circuit board 102 and attached fine tactile sensors 106 and/or coarse tactile sensors 104 are fully or partially encased in the flexible membrane, artificial skin or layer 110c. The flexible membrane, skin or layer 110c may be mechanically coupled (e.g., adhesively) to, or may otherwise be supported by, the backing 108. Alternatively or additionally, the flexible membrane, artificial skin or layer 110c may be mechanically coupled (e.g., adhesively) to, or may otherwise be supported by, the printed circuit board 102.

Figure 1D:
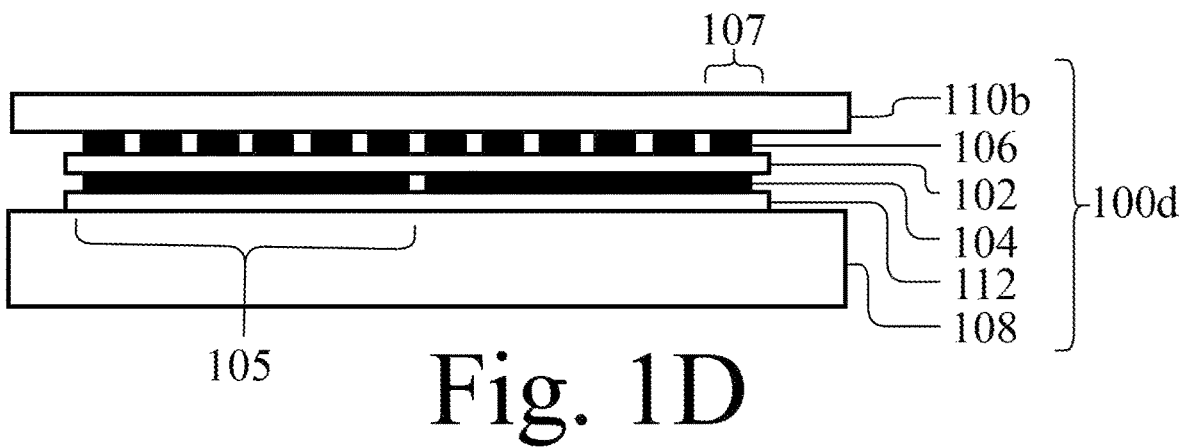
FIG. 1D is a side elevational view of a sensor array structure according to at least one illustrated implementation, the sensor array structure including a coarse set of sensors and a fine set of sensor, carried by respective printed circuit boards, the sensors of the fine set of sensors arranged with respect to the sensor(s) of the coarse set of sensors to provide at least two different sensor resolutions, and further comprising a flexible covering or artificial skin overlying the sensors.

FIG. 1D shows a sensor array structure 100d, according to at least one illustrated implementation. The sensor array structure 100d, is similar or even identical in many respects to the sensor array structure 100a (FIG. 1A), the sensor array structure 100b (FIG. 1B), and/or the sensor array structure 100c (FIG. 1C), similar or even identical structures identified using the same reference numbers as used with respect to the implementations of FIGS. 1A, 1B and 1C. Only significant differences are described below.

Most notably, the sensor array structure 100d, comprises two distinct printed circuit boards, a first printed circuit board 102 that carries the fine tactile sensors 106 and a second printed circuit board 112 that carries the coarse tactile sensors 104.

The second printed circuit board 112 may be mechanically coupled (e.g., adhesively) to, or may otherwise be supported by, the backing 108. Alternatively or additionally second printed circuit board 112 may be mechanically coupled (e.g., adhesively) to, or may otherwise be supported by, the first printed circuit board 102.

It is noted that any implementation may comprise a plurality of printed circuit boards, the printed circuit boards for example arrayed across a backing or arrayed across multiple backings, and/or arrayed across an artificial skin or arrayed across multiple distinct artificial skin portions. Thus, an implementation may include multiple printed circuit boards, each printed circuit board which carries both a respective set of coarse tactile sensors 104 and a respective set of fine tactile sensors 106. Alternatively or additionally, an implementation may include multiple pairs of printed circuit boards where one printed circuit board of each pair carries a respective set of coarse tactile sensors 104 and the other printed circuit board of each pair carries a respective set of fine tactile sensors 106.

Figure 2:
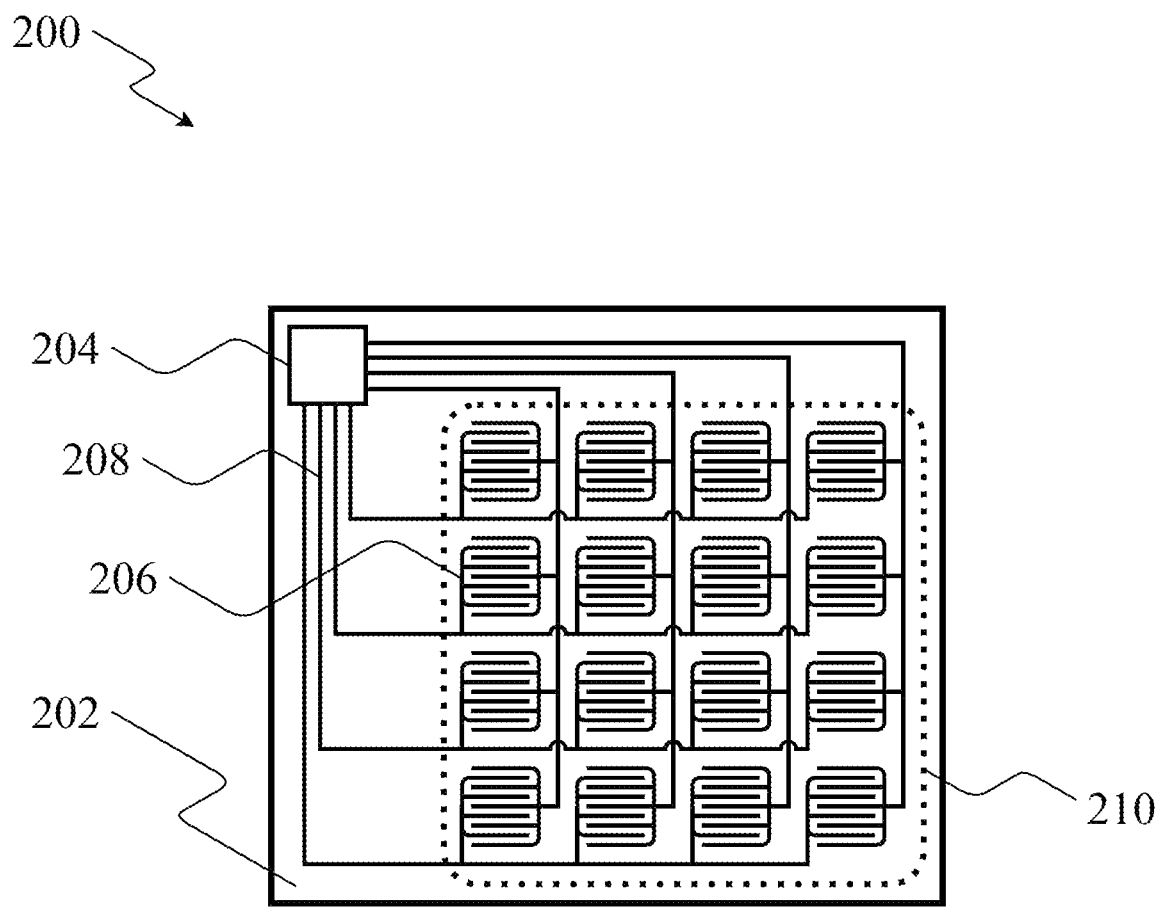
FIG. 2 is a top plan view of a sensor array system according to at least one illustrated implementation, the sensor array structure including a coarse set of sensors, a fine set of sensors, and at least one electronic processor, along with electrical connections, leads, paths or traces between the sensors and the electronic processor(s).

FIG. 2 is a top plan view of a sensor array system 200 according to at least one illustrated implementation. The sensor array system 200 comprises a printed circuit board, for example a flexible printed circuit board 202. Coupled to the flexible printed circuit board 202 is a fine tactile sensor electronic processor 204 which may, for example, take the form of a microcontroller, central processing unit (CPU), accelerated processing unit (APU), graphics processing unit (GPU), microprocessor, application specific integrated circuit (ASIC), analog-to-digital converter (ADCs) or other electronic controller capable of electrical input and output operations, and optionally performing logic operations, along with associated memory (e.g., registers).

The sensor array system 200 includes a set of fine tactile sensors 206 (only one called out), attached to or part of the flexible circuit board 202. In the illustrated implementation, the fine tactile sensors 206 are each composed of a pair of electrically conductive traces formed as interdigitated combs, which are separated by a distance, disallowing direct current from flowing between them. Each of the pairs of interdigitated combs being a contact for the respective fine sensor.

A set of electrical leads 208 (only one called out) are deposited or etched on the flexible printed circuit board 202, electronically coupling the fine tactile sensor electronic processor 204 to the set of fine tactile sensors 206 such that the set of fine tactile sensors 206 are coupled to the electronic processor 204 in a multiplexed configuration that enables the fine tactile sensor electronic processor 204 to measure the resistance across any of the fine tactile sensors 206 of the set of fine tactile sensors 206. Other implementations may have the fine tactile sensor electronic processor 204 coupled to the set of fine tactile sensors 206 through some other configuration.

Mechanically (e.g., adhesively) coupled to the flexible printed circuit board 202 is an FSR sheet 210, the FSR sheet 210 being composed of an FSR material such as Velostat® or other material having the property of resistivity being related to strain, pressure, or stress applied to the material or portion thereof. The FSR sheet 210 is electrically coupled to the interdigitated combs of the fine tactile sensors 206 such that the resistance across a fine tactile sensor 206 is indicative of the strain of the FSR sheet 210 at or near the fine tactile sensor 206, and the pressure applied to the FSR material at that area. Other implementations may have a set of smaller FSR sheets covering individual sensors or groupings of sensors.

Figure 3A:
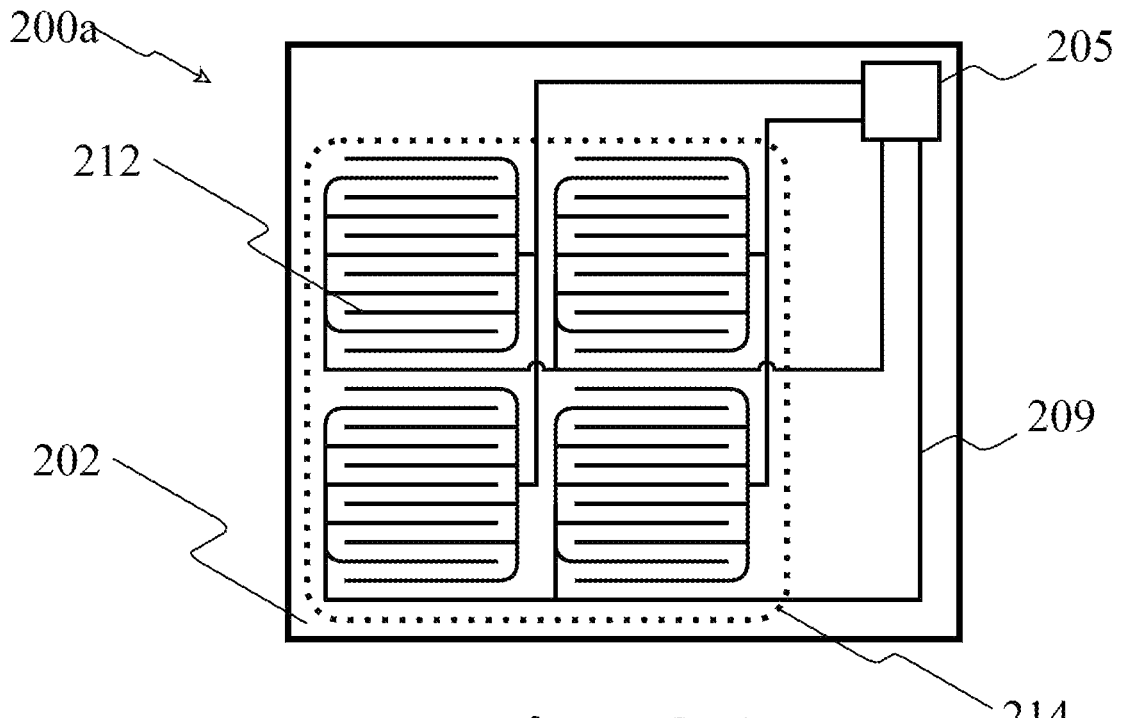
FIG. 3A is a bottom plan view of the sensor array system of FIG. 2, according to at least one illustrated implementation.

FIG. 3A is a bottom plan view of a sensory array system 200a according to at one illustrated implementation. The sensory array system 200a may be the same sensory array system 200 illustrated in FIG. 2, with the obverse side being illustrated.

The sensor array system 200a, according to at least one implementation comprises a coarse tactile sensor electronic processor 205 which may, for example, take the form of a microcontroller, central processing unit (CPU), accelerated processing unit (APU), graphics processing unit (GPU), microprocessor, application specific integrated circuit (ASIC), analog-to-digital converter (ADCs) or other electronic controller capable of electrical input and output operations, and optionally performing logic operations, along with associated memory (e.g., registers). The coarse tactile sensor electronic processor 205 is coupled to flexible printed circuit board 202.

The sensor array system 200a includes a set of coarse tactile sensors 212 (only one called out), attached to or part of the flexible circuit board 202. The coarse tactile sensors 212 may be similar to the fine tactile sensors 206 (e.g., each composed of a pair of electrically conductive traces formed as interdigitated combs) but larger in scale, covering a wider area. The set of coarse sensors 212 may be arrayed over approximately the same area as fine sensors 206 but on the other side of the flexible printed circuit board 202.

A second set of electrical leads 209 (only one called out) are deposited or etched on the flexible printed circuit board 202 electronically coupling the coarse tactile sensor electronic processor 205 to the set of coarse tactile sensors 212 such that the set of coarse tactile sensors 212 are coupled to the electronic processor 205 in a multiplexed configuration that enables the coarse tactile sensor electronic processor 205 to measure the resistance across any of the coarse tactile sensors 212 of the set of coarse sensors 212. Other implementations may have the coarse tactile sensor electronic processor 205 coupled to the set of coarse tactile sensors 212 through some other configuration.

The coarse tactile sensor electronic processor 205 may be communicatively coupled to the fine tactile sensor electronic processor 204, for example via one or more electrically conductive traces, wires, and/or vias. Alternatively, some implementations may use a single electronic processor 204, 205 to which both the set of fine tactile sensors 206 and the set of coarse tactile sensors 212 are communicatively coupled.

Mechanically (e.g., adhesively) coupled to the flexible printed circuit board 202 is a second FSR sheet 214, the second FSR sheet 214 being composed of an FSR material such as Velostat® or other material having the property of resistivity being related to strain, pressure, or stress applied to the material or portion thereof. The second FSR sheet 214 is electrically coupled to the interdigitated combs of the coarse tactile sensors 212 such that the resistance across a coarse tactile sensor 212 is indicative of the strain of the second FSR sheet 214 at or near the coarse tactile sensor 206, and the pressure applied to the FSR material at that area. Other implementations may have a set of smaller FSR sheets covering individual sensors or groupings of sensors.

Figure 3B:
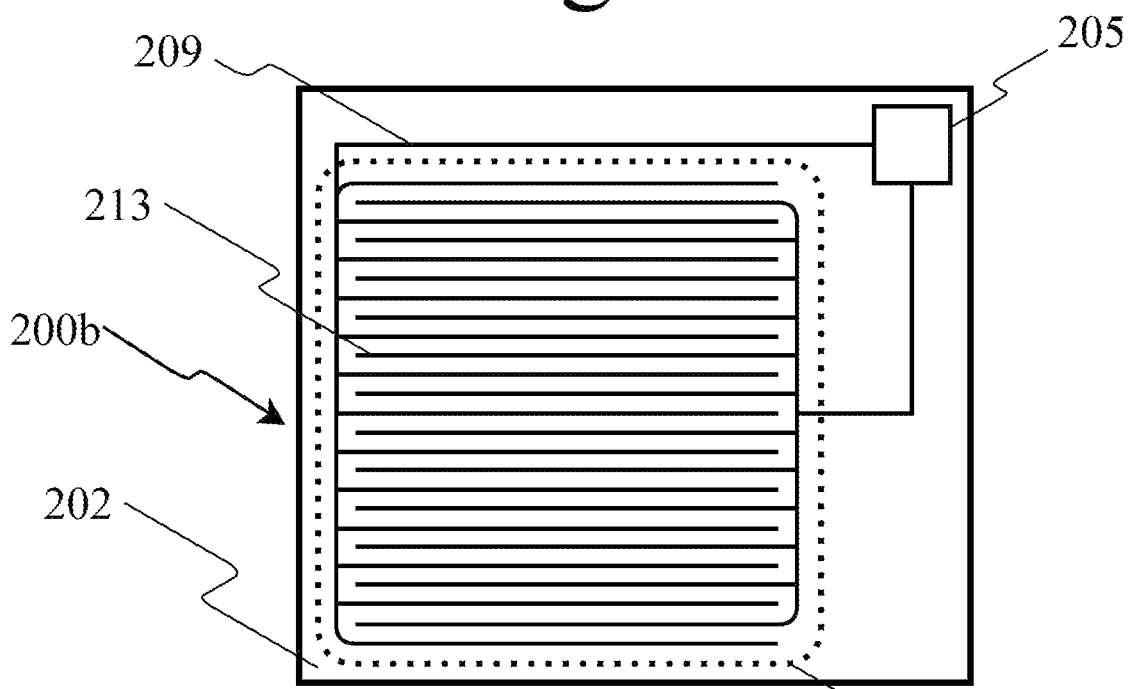
FIG. 3B is a bottom plan view of the sensor array system of FIG. 2, according to at least another illustrated implementation.

FIG. 3B is a bottom plan view of a sensory array system 200b, according to at another illustrated implementation. The sensory array system 200b may be the same sensory array system 200 illustrated in FIG. 2, with the obverse side being illustrated. The sensor array system 200b may be similar or even identical in some aspects to the sensor array system 200a (FIG. 3A), similar or even identical structures identified with the same reference numbers. Only significant differences are described below.

The sensor array system 200b employs a single coarse tactile sensor 213 in lieu of the array of coarse tactile sensors 212.

FIGS. 4A, 4B, 4C, 4D, 4E, and 4F show a variety of implementations of shapes, sizes, and arrangements of activation areas of a set of fine sensors and an activation area of a corresponding coarse sensor, according to various implementations.

Figures 4A, 4B:
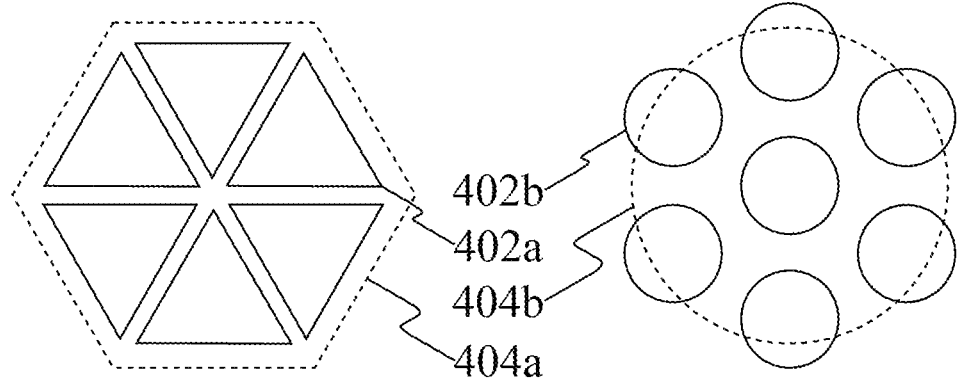
FIG. 4A is a top plan view of a sensory array structure with a first set of sensors and a second set of sensors, the sensors of the second set having a different shape from the sensor of the first set of sensors, and individual sensors of the second set of sensors arranged within and spaced from a perimeter of a sensor of the first set of sensory, according to at least one illustrated implementation.
FIG. 4B is a top plan view of a sensory array structure with a first set of sensors and a second set of sensors, the sensors of the second set having a same overall shape as the sensor of the first set of sensors, and at least some of the individual sensors of the second set of sensors arranged overlapping a perimeter of a sensor of the first set of sensory, according to at least one illustrated implementation.

FIG. 4A shows a set of fine sensor activation areas 402a each having a triangular geometric shape, and arranged in a repeating angular array angularly arranged about a central axis or point. FIG. 4A also shows a coarse sensor activation area 404a having hexagonal geometric shape. The coarse sensor activation area 404a fully encompasses the set of fine sensor activation areas 402a with a perimeter of the coarse sensor activation area 404a spaced outwardly of the outermost portions of the set of fine sensor activation areas 402a. In some implementations, the coarse sensor activation area 404a may only partially encompass the fine sensor activation areas 402a, for example with the fine sensor activation areas 402a overlapping and extending relatively outwardly away from a perimeter of the coarse sensor activation area 404a, or alternatively a portion of the fine sensor activation areas 402b may be adjacent, tangent to, or coterminous with, the perimeter of the coarse sensor activation area 404a.

FIG. 4B shows a set of fine sensor activation areas 402b each having a circular geometric shape, and arranged in a repeating angular array angularly arranged about a central axis or point. FIG. 4B also shows a coarse sensor activation area 404b having a circular geometric shape. The coarse sensor activation area 404b partially encompasses the set of fine sensor activation areas 402b with the coarse sensor activation area 404b overlapping a portion of each of the fine sensor activation areas 402b, and a portion of each of the extending fine sensor activation areas 402b outwardly of the coarse sensor activation area 404b. In some implementations, the coarse sensor activation area 404b may fully encompass the fine sensor activation areas 402b, for example with the fine sensor activation areas 402b spaced relatively inwardly away from a perimeter of the coarse sensor activation area 404b, or with a portion of the fine sensor activation areas 402b adjacent, tangent to, or coterminous with, the perimeter of the coarse sensor activation area 404b.

Figures 4C, 4D:
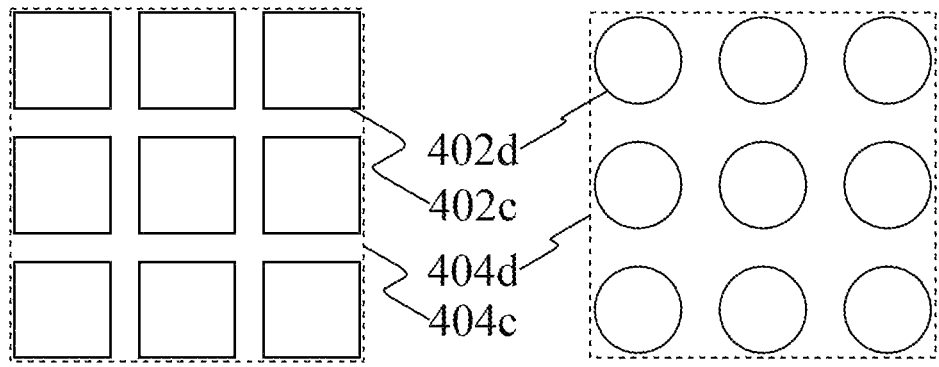
FIG. 4C is a top plan view of a sensory array structure with a first set of sensors and a second set of sensors, the sensors of the second set having a same overall shape as the sensor of the first set of sensors, and individual sensors of the second set of sensors arranged within and adjacent with a perimeter of a sensor of the first set of sensory, according to at least one illustrated implementation.
FIG. 4D is a top plan view of a sensory array structure with a first set of sensors and a second set of sensors, the sensors of the second set having a different shape from the sensor of the first set of sensors, and individual sensors of the second set of sensors arranged within and adjacent with a perimeter of a sensor of the first set of sensory, according to at least one illustrated implementation.

FIG. 4C shows a set of fine sensor activation areas 402c each having a square geometric shaped, and arranged in a repeating two-dimensional array. FIG. 4C also shows a coarse sensor activation area 404c having a square geometric shape that encompasses the set of fine sensor activation areas 402c with outermost ones of the set of fine sensor activation areas 402c each having a respective edge that is adjacent or coterminous or co-extensive with a perimeter of the coarse sensor activation area 404c. In some implementations, the coarse sensor activation area 404c may only partially encompass the fine sensor activation areas 402c, for example with the fine sensor activation areas 402c overlapping and extending relatively outwardly away from a perimeter of the coarse sensor activation area 404c. Alternatively a portion of the fine sensor activation areas 402c may be spaced inwardly away from the perimeter of the coarse sensor activation area 404c.

FIG. 4D shows a set of fine sensor activation areas 402d each having a circular geometric shape, and arranged in a repeating two-dimensional array. FIG. 4D also shows a coarse sensor activation area 404d having a coarse sensor activation area 404d having a square geometric shape that encompasses the set of fine sensor activation areas 402d with outermost ones of the fine sensor activation areas 402d each having a respective edge that is adjacent, tangent to, or coterminous or co-extensive with, a perimeter of the coarse sensor activation area 404d. In some implementations, the coarse sensor activation area 404d may only partially encompass the fine sensor activation areas 402d, for example with the fine sensor activation areas 402d overlapping and extending relatively outwardly away from a perimeter of the coarse sensor activation area 404d. Alternatively a portion of the fine sensor activation areas 402d may be spaced inwardly away from the perimeter of the coarse sensor activation area 404d.

Figures 4E, 4F:
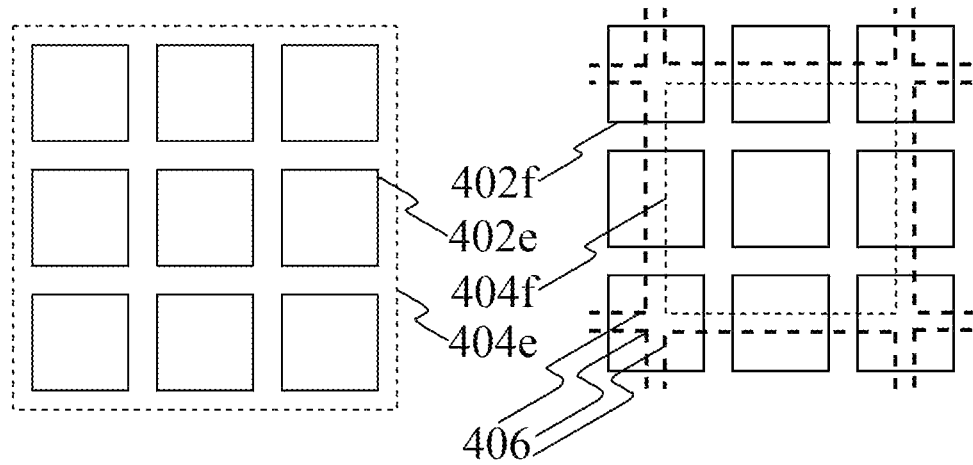
FIG. 4E is a top plan view of a sensory array structure with a first set of sensors and a second set of sensors, the sensors of the second set having a same overall shape as the sensor of the first set of sensors, and individual sensors of the second set of sensors arranged within and spaced from a perimeter of a sensor of the first set of sensory, according to at least one illustrated implementation.
FIG. 4F is a top plan view of a sensory array structure with a first set of sensors and a second set of sensors, the sensors of the second set having a same overall shape as the sensor of the first set of sensors, and at least some of the individual sensors of the second set of sensors arranged overlapping a perimeter of a sensor of the first set of sensory, according to at least one illustrated implementation.

FIG. 4E shows a set of fine sensor activation areas 402e each having a square geometric shape, and arranged in a repeating two-dimensional array. FIG. 4E also shows a coarse sensor activation area 404e having a square shape that fully encompasses the set of fine sensor activation areas 402e with outermost ones of the fine sensor activation areas 402e having outermost edges that are spaced relatively inwardly with respect to a perimeter of the coarse sensor activation area 404e. In some implementations, the coarse sensor activation area 404e may only partially encompass the set of fine sensor activation areas 402e with outermost ones of the fine sensor activation areas 402e having outermost edges that are spaced relatively outwardly with respect to a perimeter of the coarse sensor activation area 404e.

FIG. 4F shows a set of fine sensor activation areas 402f each having a geometric shape, and arranged in a repeating two-dimensional array. FIG. 4F also shows a set of coarse sensor activation area including a coarse sensor activation area 404f and a number of neighboring coarse sensor activation areas 406 (only three called out). The coarse sensor activation area 404f and a number of neighboring coarse sensor activation areas 406 each have a square geometric shape. Each of the coarse sensor activation area 404f and a number of neighboring coarse sensor activation areas 406 fully or partially encompass a plurality of the fine sensor activation areas 402f. For example, in the illustrated implementation the coarse sensor activation area 404f fully encompasses one of the set of fine sensor activation areas 402f and partially encompasses eight (8) other outermost ones of the set of fine sensor activation areas 402f, the coarse sensor activation area 404f having a perimeter that overlaps the eight (8) other ones of the set of fine sensor activation areas 402f. In the illustrated implementations, each of the neighboring coarse sensor activation areas 406 overlap some of the set of fine sensor activation areas 402f such that a subset of the set of fine sensor activation areas 402f may overlap with a plurality of coarse sensor activation areas. While illustrated as one coarse sensor activation area 404f per nine (9) fine sensor activation areas 402f, some implementations may employ a different ratio, for example including a larger number of fine sensor activation areas 402f relative to each coarse sensor activation area 404f. Additionally or alternatively, some implementations may employ arrangements that differ from those illustrated (e.g., different from angular arrays, different from two-dimensional arrays). Further, while the sensor activation areas may correspond to the actual area of a corresponding sensor over which the sensor is responsive, in some implementations, the sensor activation areas may be larger, corresponding to an area of a portion of an artificial skin over which the corresponding sensor is responsive.

Figure 5:
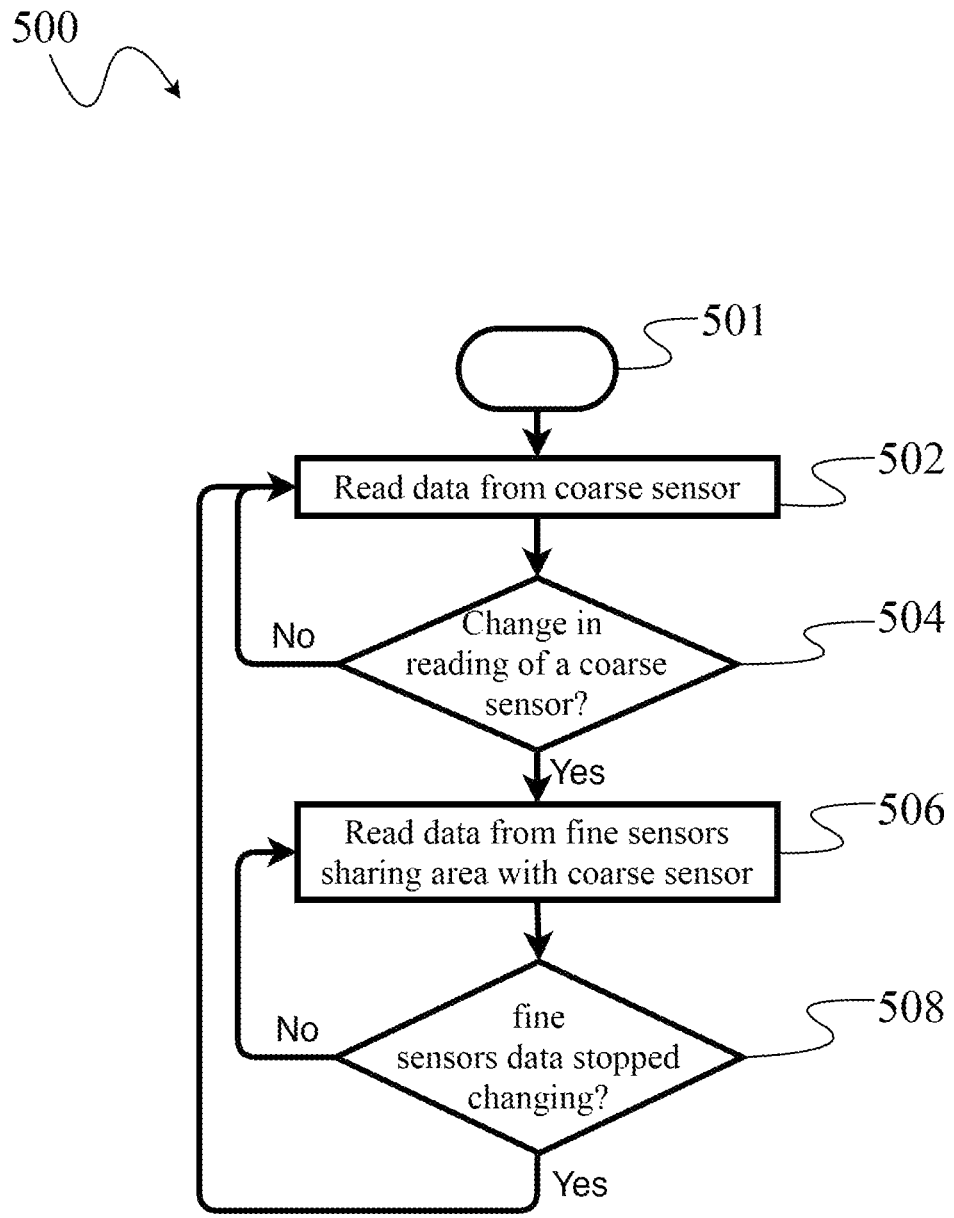
FIG. 5 is a flow diagram illustrating a method of operating a sensor array system having a coarse set of sensors and a fine set of sensors, according to at least one illustrated implementation.

FIG. 5 shows a method of operation 500 of a processor-based system to generate a feed of pressure or force measurements or intensities for corresponding locations applied to a surface having a tactile sensor array, according to at least one illustrated implementation. The processor-based system may be part of a sensor array structure 100a (FIG. 1A), 100b (FIG. 1B), 100c (FIG. 1C), 100d (FIG. 100D), such as the sensor array system 200 (FIG. 2), 200a (FIG. 3A), 200b (FIG. 3B), or may be a different processor communicatively coupled to the sensor array structure 100a (FIG. 1A), 100b (FIG. 1B), 100c (FIG. 1C), 100d (FIG. 100D).

The method 500, and other methods described herein, may be varied to include other acts, omit acts, and/or vary acts, or perform acts in a different order to accommodate alternative implementations. The method 500 is described as being performed by a processor-based system, for example, by electronic processor 204, 205, in conjunction with other components, such as those found in sensor array structure 100a (FIG. 1A), 100b (FIG. 1B), 100c (FIG. 1C), 100d (FIG. 100D) and/or sensor array system 200 (FIG. 2), 200a (FIG. 3A), 200b (FIG. 3B). The processor-based system in this and other methods is referred to as singular but may be performed by multiple processor-based systems. In method 500 and other methods a processor-based system may be described as performing an act and this includes performing the act or causing the act to be performed. The processor-based system performs the method 500 in response to executing processor-executable instructions or other logic.

At 501, the method 500 starts. For example, the method 500 may start in response to a startup of the system, an external request from a different processor system, or a call or invocation from a calling routine or program.

At 502, the processor-based system receives, captures or otherwise determines a set of coarse pressure or force data from a set of coarse pressure sensors such as to the set of coarse sensors 212. The set of coarse pressure or force data may, for example, be stored to a nontransitory data storage medium (e.g., computer memory, processor registers, magnetic disk, Flash memory).

At 504, the processor-based system retrieves and compares the last two sets of coarse pressure or force data stored. If the two sets of coarse pressure or force data compared have a quantitative difference larger than a predefined threshold the processor-based system proceeds to 506. Otherwise, if the different is smaller than the predefined threshold, or if there are not two sets of coarse pressure or force data stored, the method loops back to 502.

At 506, the processor-based system captures or otherwise determines a set of fine pressure or force data from a set of fine pressure sensors such as to the set of coarse sensors 212. The set of coarse pressure or force data is stored to a nontransitory data storage medium (e.g., computer memory, processor registers, magnetic disk, Flash memory).

At 508, the processor-based system retrieves and compares the last two sets of fine pressure or force data stored. If the two sets of fine pressure or force data compared have a quantitative difference smaller than a predefined threshold the processor-based system proceeds to 502. Otherwise, if the difference is smaller than the predefined threshold, or if there are not two sets of fine pressure or force data stored, the method loops back to 506.

In other implementations, the method may communicate with other electronic processors, or utilize other criteria for determining when to loop, such as a rolling average rate of change. In yet other implementations, the method may run in a variety of threads each of which monitors a subset of coarse pressure sensors and their respective subset of fine pressure sensors. Additionally or alternatively, the method may include polling the coarse sensors at a first frequency or rate that is a higher frequency or rate than a frequency or rate of polling of the fine sensors, which may occur until a defined criteria is met on the measurements of the coarse sensors and/or on the increasing of the polling frequency or rate of the fine sensors.

The embodiments described above, as well as combinations or variations thereof offer distinct advantages over other system. Two such advantages are bandwidth and power requirement reduction, since a minimal number of sensor readings are made unless there is an immediate need for higher temporal and/or spatial resolution.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus to provide tactile sensing, comprising:
a first coarse tactile sensor, the first coarse tactile sensor having a respective sensor surface area over which the first coarse tactile sensor is responsive to at least one of force or pressure, the respective surface area of the first coarse tactile sensor having an area greater than a first value; and
a first set of fine tactile sensors comprising a plurality of fine tactile sensors, each of the fine tactile sensors of the first set of fine tactile sensors having a respective sensor surface area over which the fine tactile sensor is responsive to at least one of force or pressure, the respective surface area of each of the fine tactile sensors of the first set of sensors having a respective area less than or equal to the first value, the plurality of fine tactile sensors of the first set of fine tactile sensors arrayed with respect to one another, the arrayed fine tactile sensors of the first set of fine tactile sensors delineating a first arrayed footprint of the first set of fine tactile sensors, wherein the first coarse tactile sensor overlaps at least a portion of each of the fine tactile sensors of first set of fine tactile sensors;
wherein at least one of the first coarse tactile sensor and/or any one of the first fine tactile sensors comprises a pair of interdigitated comb electrodes, with force sensing resistor material overlying or underlying the pair of interdigitated comb electrodes.

2. The apparatus of claim 1, further comprising:
at least a first set of circuitry, the first set of circuitry communicatively coupled to the first coarse tactile sensor and operable in response to detection, by the first coarse tactile sensor, of at least one of force or pressure to cause each of the fine tactile sensors of the first set of fine tactile sensors to be monitored.

3. The apparatus of claim 1, further comprising:
at least a first set of circuitry, the first set of circuitry communicatively coupled to the first coarse tactile sensor and operable in response to detection, by the first coarse tactile sensor, of at least one of force or pressure which exceeds a first threshold to monitor each of the fine tactile sensors of the first set of fine tactile sensors.

4. The apparatus of claim 1, further comprising:
at least a first set of circuitry, the first set of circuitry communicatively coupled to the first coarse tactile sensor and operable to cause the fine tactile sensors of the first set of fine tactile sensors to be monitored for a defined period of time after detection of at least one of force or pressure sensed by the first coarse tactile sensor.

5. The apparatus of claim 1, further comprising:
at least a first set of circuitry, the first set of circuitry communicatively coupled to the first coarse tactile sensor and operable to cause the fine tactile sensors of the first set of fine tactile sensors to be monitored for a stable value of force or pressure for a defined period of time after detection of at least one of force or pressure by the first coarse tactile sensor, and in response to detection of a stable value of force or pressure to cause the stable value of force or pressure to be stored in a non-transitory processor-readable media.

6. The apparatus of claim 1, further comprising:
at least a first set of circuitry, the first set of circuitry communicatively coupled to the first coarse tactile sensor and operable to cause each of the fine tactile sensors of the first set of fine tactile sensors to monitor for force or pressure only during a detection of at least one of force or pressure sensed by the first coarse tactile sensor.

7. The apparatus of claim 1 wherein the respective sensor surface area of the first coarse tactile sensor fully encompasses the first arrayed footprint of the first set of fine tactile sensors.

8. The apparatus of claim 1 wherein the respective sensor surface area of the first coarse tactile sensor is in registration with the first arrayed footprint of the first set of fine tactile sensors.

9. The apparatus of claim 1 wherein the first arrayed footprint of the first set of fine tactile sensors fully encompasses the respective sensor surface area of the first coarse tactile sensor.

10. The apparatus of claim 1, further comprising:
a second coarse tactile sensor, the second coarse tactile sensor having a respective sensor surface area over which the second coarse tactile sensor is responsive to at least one of force or pressure, the respective surface area of the second coarse tactile sensor having an area greater than a second value; and
a second set of fine tactile sensors comprising a plurality of fine tactile sensors, each of the fine tactile sensors of the second set of fine tactile sensors having a respective sensor surface area over which the fine tactile sensor is responsive to at least one of force or pressure, the respective surface area of each of the fine tactile sensors of the second set of sensors having a respective area less than or equal to the second value, the plurality of fine tactile sensors of the second set of fine tactile sensors arrayed with respect to one another, the arrayed fine tactile sensors of the second set of fine tactile sensors delineating a second arrayed footprint of the second set of fine tactile sensors, wherein the second coarse tactile sensor overlaps at least a portion of each of the fine tactile sensors of second set of fine tactile sensors.

11. The apparatus of claim 1, further comprising:
at least one electronic processor communicatively coupled to the first coarse tactile sensor and communicatively coupled to the fine tactile sensors of the first set of fine tactile sensors.

12. An apparatus to provide tactile sensing, the apparatus comprising:
a first coarse tactile sensor, the first coarse tactile sensor having a respective sensor surface area over which the first coarse tactile sensor is responsive to at least one of force or pressure, the respective surface area of the first coarse tactile sensor having an area greater than a first value;
a first set of fine tactile sensors comprising a plurality of fine tactile sensors, each of the fine tactile sensors of the first set of fine tactile sensors having a respective sensor surface area over which the fine tactile sensor is responsive to at least one of force or pressure, the respective surface area of each of the fine tactile sensors of the first set of sensors having a respective area less than or equal to the first value, the plurality of fine tactile sensors of the first set of fine tactile sensors arrayed with respect to one another, the arrayed fine tactile sensors of the first set of fine tactile sensors delineating a first arrayed footprint of the first set of fine tactile sensors, wherein the first coarse tactile sensor overlaps at least a portion of each of the fine tactile sensors of first set of fine tactile sensors; and
a first printed circuit board having a first face, a second face, and at least two layers of electrically conductive traces, the first coarse tactile sensor is carried by the first face of the first printed circuit board and the first set of fine tactile sensors is carried by the second face of the printed circuit board.

13. An apparatus to provide tactile sensing. the apparatus comprising:
a first coarse tactile sensor. the first coarse tactile sensor having a respective sensor surface area over which the first coarse tactile sensor is responsive to at least one of force or pressure, the respective surface area of the first coarse tactile sensor having an area greater than a first value;
a first set of fine tactile sensors comprising a plurality of fine tactile sensors, each of the fine tactile sensors of the first set of fine tactile sensors having a respective sensor surface area over which the fine tactile sensor is responsive to at least one of force or pressure, the respective surface area of each of the fine tactile sensors of the first set of sensors having a respective area less than or equal to the first value, the plurality of fine tactile sensors of the first set of fine tactile sensors arrayed with respect to one another, the arrayed fine tactile sensors of the first set of fine tactile sensors delineating a first arrayed footprint of the first set of fine tactile sensors, wherein the first coarse tactile sensor overlaps at least a portion of each of the fine tactile sensors of first set of fine tactile sensors; and
a first printed circuit board having a first face, a second face, and at least one layer of electrically conductive traces, the first coarse tactile sensor is carried by the first face of the first printed circuit board; and
a second printed circuit board having a first face, a second face, and at least one layer of electrically conductive traces, the first set of fine tactile sensors is carried by the first face of the second printed circuit board, and the second printed circuit board is physically coupled to the first printed circuit board.

14. A method to provide tactile sensing using a first coarse tactile sensor and a first set of fine tactile sensors, the first coarse tactile sensor having a respective sensor surface area over which the first coarse tactile sensor is responsive to at least one of force or pressure, the respective surface area of the first coarse tactile sensor having an area greater than a first value, and the first set of fine tactile sensors comprising a plurality of fine tactile sensors, each of the fine tactile sensors of the first set of fine tactile sensors having a respective sensor surface area over which the fine tactile sensor is responsive to at least one of force or pressure, the respective surface area of each of the fine tactile sensors of the first set of sensors having a respective area less than or equal to the first value, the plurality of fine tactile sensors of the first set of fine tactile sensors arrayed with respect to one another, the arrayed fine tactile sensors of the first set of fine tactile sensors delineating a first arrayed footprint of the first set of fine tactile sensors, wherein the first coarse tactile sensor overlaps at least a portion of each of the fine tactile sensors of first set of fine tactile sensors, wherein at least one of the first coarse tactile sensor and/or any one of the first fine tactile sensors comprises a pair of interdigitated comb electrodes, with force sensing resistor material overlying or underlying the pair of interdigitated comb electrodes, the method comprising:
monitoring the first coarse tactile sensor for application of at least one of force or pressure thereto; and
in response to a detection of at least one of force or pressure applied to the first coarse tactile sensor, monitoring the first set of fine tactile sensors, each of the fine tactile sensors in the first set of fine tactile sensors having a sensor surface area that is smaller than a sensor surface area of the first coarse tactile sensor.

15. The method of claim 14 wherein monitoring the first coarse tactile sensor for application of at least one of force or pressure thereto includes monitoring the first coarse tactile sensor for application of at least one of force or pressure which exceeds a first threshold.

16. The method of claim 14 wherein monitoring the first set of fine tactile sensors includes monitoring each of the fine tactile sensors in the first set of fine tactile sensors for a defined period of time.

17. The method of claim 14 wherein monitoring the first set of fine tactile sensors includes monitoring each of the fine tactile sensors in the first set of fine tactile sensors over a defined period of time for a stable value of force or pressure, and further comprising:
in response to detection of a stable value of force or pressure, storing the stable value of force or pressure.

18. The method of claim 17 wherein monitoring each of the fine tactile sensors in the first set of fine tactile sensors over a defined period of time for a stable value of force or pressure includes monitoring each of the fine tactile sensors in the first set of fine tactile sensors over the defined period of time for at least one of a force or pressure that exceeds a first threshold value and that does not change by more than a defined amount over two or more sub-periods of the defined period of time.

19. The method of claim 14 wherein monitoring the first set of fine tactile sensors includes monitoring each of the fine tactile sensors in the first set of fine tactile sensors only during a detection of at least one of a force or pressure sensed by the first coarse tactile sensor.

* * * * *